United States Patent [19]

Battes

[11] 3,760,272

[45] Sept. 18, 1973

[54] HIGH IMPEDANCE SIGNAL LEVEL DETECTOR

[76] Inventor: Robert J. Battes, 25 E. Palatine Rd., Arlington Heights, Ill. 60004

[22] Filed: Aug. 25, 1970

[21] Appl. No.: 66,832

[52] U.S. Cl................. 324/111, 324/99 D, 324/120, 332/14

[51] Int. Cl......................... G01r 19/26, G01r 17/06

[58] Field of Search....................... 324/111, 120, 99, 324/99 D; 332/9 T, 14

[56] References Cited

UNITED STATES PATENTS

| | | | |
|---|---|---|---|
| 3,303,493 | 2/1967 | Charbonnier | 324/99 D |
| 3,564,406 | 2/1971 | Henderson et al. | 324/99 D |
| 3,040,273 | 6/1962 | Boff | 332/9 T |
| 3,412,392 | 11/1968 | Jenkins et al. | 324/133 X |
| 3,560,878 | 2/1971 | Wickliff | 332/14 X |

*Primary Examiner*—Rudolph V. Rolinec
*Assistant Examiner*—Ernest F. Karlsen
*Attorney*—Paul D. Flehr et al.

[57] ABSTRACT

A high impedance signal level detector for use in electronic apparatus, such as instrumentation and the like, whereby pairs of electronic pulses may be generated in which the elapsed time between the pulses in each pair is as directly proportional as desired, or nearly so, to the amplitude of an applied DC voltage. Means are provided for the precise adjustment of the time between pulses in each pair to compensate for circuit component variations, or to provide a deliberately induced off-set in time between the pulses in each pair which is not related to the amplitude of the applied input signal voltage.

3 Claims, 1 Drawing Figure

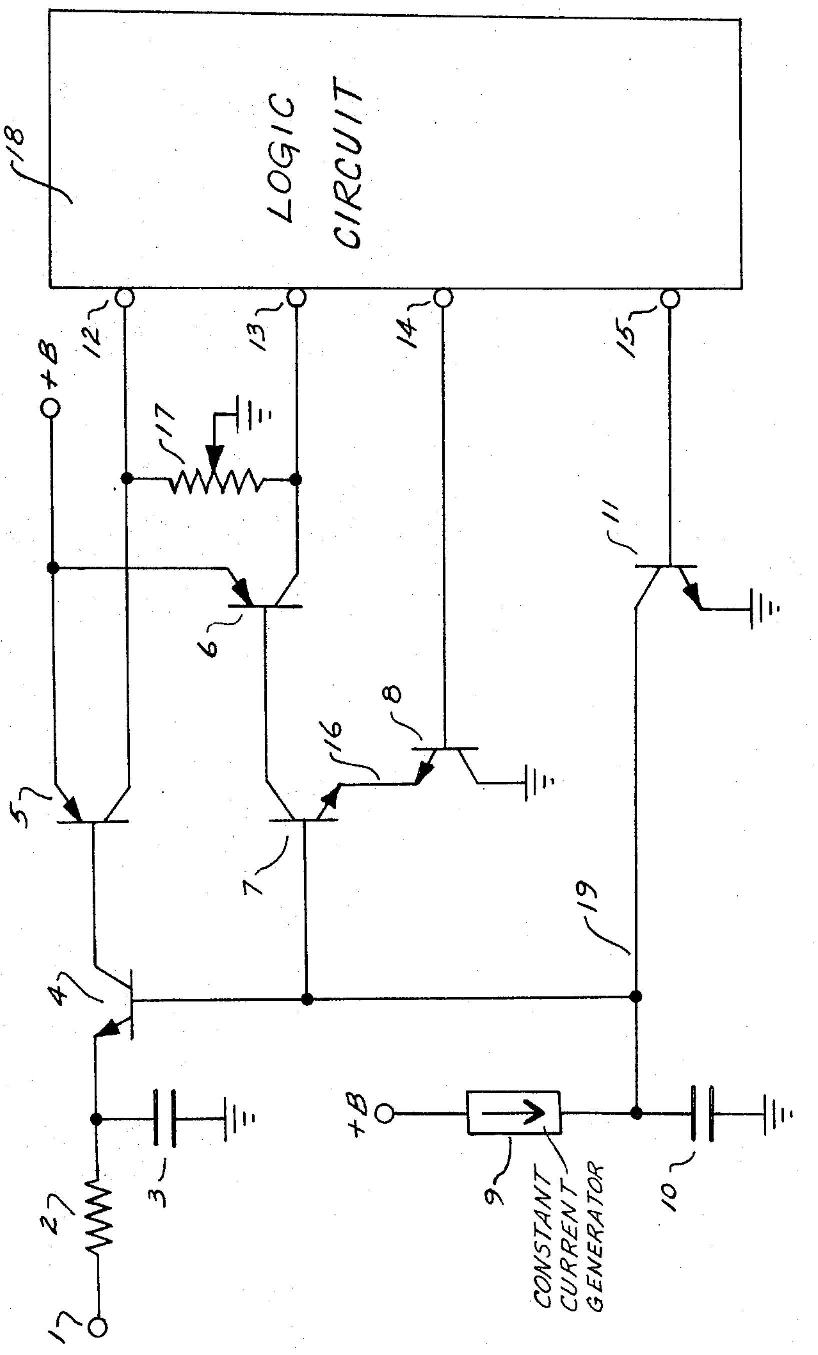
LOGIC CIRCUIT
CONSTANT CURRENT GENERATOR
+B
+B
1
2
3
4
5
6
7
8
9
10
11
12
13
14
15
16
17
18
19

HIGH IMPEDANCE SIGNAL LEVEL DETECTOR

This invention relates to the process of signal level detection, and has for its principal object the provision of an improved apparatus and method of operation whereby pairs of electronic pulses may be generated in which the elapsed time between the pulses in each pair is as directly proportional as desired, or nearly so, to the amplitude of an applied D.C. voltage, said apparatus being much simpler and more economical to construct and use than other methods available heretofore.

Other objects and advantages, as well as novel features of this invention will be brought out in the following detailed description.

The FIGURE is a schematic diagram of the detector.

A positive D.C. input signal voltage whose level is to be detected, $V_1$, is applied to the input of the circuit at terminal 1. Just before the detection process is started, positive voltages are applied to logic circuit terminals 14 and 15 by logic circuit 18, causing reference signal level detector analog switch transistor 8 and shorting transistor 11 to conduct, placing circuit nodes 16 and 19 close to ground potential. Since the base of input signal level detector transistor 4 is also near ground potential when shorting transistor 11 is conducting, the emitter of input signal level detector transistor 4 draws negligible current, so that input signal storage element capacitor 3 charges up to the exact value of input signal voltage $V_1$ at terminal 1, or nearly so, through resistor 2.

As the detection process is started, the positive voltage heretofore placed on terminal 15 by logic circuit 18 is changed to near ground potential, turning off shorting transistor 11. When shorting transistor 11 stops conducting, the output of constant-current generator 9 is no longer shorted out by shorting transistor 11, but rather starts charging current integrating capacitor 10 linearly with time in a positive-going direction.

Eventually, the voltage across current integrating capacitor 10 reaches a magnitude which is just sufficient to turn on reference signal level detector transistor 7. The current passing through reference signal level detector transistor 7 is amplified by amplifier transistor 6 and the output from amplifier transistor 6, which is called for convenience the START pulse, is applied to logic circuit 18 at terminal 13.

When the START pulse is received at logic circuit terminal 13 from amplifier transistor 6 and reference signal level detector transistor 7 as described above, logic circuit 18 changes the positive potential heretofore present at logic circuit terminal 14 to a voltage near ground potential. This stops amplifier transistor 6, reference signal level detector transistor 7 and reference signal level detector analog switch transistor 8 from conducting, removing the load temporarily placed on current integrating capacitor 10 by reference signal level detector transistor 7 when it was in conduction, and ends the START pulse. Since the circuit operation is very rapid, the duration of the START pulse is very short, and the momentary load presented by reference signal level detector transistor 7 on the voltage present on current integrating capacitor 10 during its short period of operation is very slight.

As current integrating capacitor 10 continues to charge, it eventually reaches a voltage which causes input signal level detector transistor 4 to conduct. The current passing through input signal level detector transistor 4 is amplified by amplifier transistor 5 and an output, which for convenience is called the STOP pulse, is applied to logic circuit 18 at terminal 12.

Immediately upon receiving a current at logic circuit terminal 12 from input signal level detector transistor 4 and amplifier transistor 5, logic circuit 18 applies a positive potential at terminal 15 which causes transistor 11 to conduct. This brings the voltage at circuit node 19 back near ground potential, turning off input signal level detector transistor 4 and amplifier transistor 5, ending the STOP pulse. Soon thereafter a positive potential is also applied to terminal 14 by logic circuit 18 which turns on reference signal level detector analog switch transistor 8 in readiness for the next detection cycle, as described above.

During the brief conducting period of input signal level detector transistor 4, the voltage at the emitter of input signal level detector transistor 4 is clamped to a constant value equal to the amplitude of the input signal load at terminal 1, or nearly so, by input signal storage element capacitor 3.

With the proper choice of circuit elements, input signal level detector transistor 4 will conduct for only a very short period of time, since bringing the voltage at circuit node 19 rapidly near ground potential stops the conduction of input signal level detector transistor 4. Furthermore, since input signal level detector transistor 4 is biased off at all times except for a very short period of time during the brief STOP pulse, the average equivalent input impedance at the emitter of input signal level detector transistor 4 is extremely high, on the order of 100 megohms or more for inexpensive but well-made silicon transistors which are readily available.

In a practical application of this circuit, it is desirable to place a resistance between terminal 1 and ground potential to prevent a gradual increase in the charge on input signal storage element capacitor 3 due to the occasional operation of input signal level detector transistor 4. This requirement will be satisfied, however, if the source resistance of the input voltage applied to terminal 1 is reasonably low, or if a resistive attenuator is installed between terminal 1 and ground. Normally a resistive path of 10 megohms between terminal 1 and ground potential is adequate to prevent charge buildup on input signal storage element capacitor 3.

Potentiometer 17 is designed to provide for the placement of unequal loads on the outputs of amplifier transistors 5 and 6, thus allowing for precise compensation of effects due to uneven offset voltages and current gains in the various transistors, as outlined below.

The detection cycle may be repeated as frequently as desired, assuming enough time elapses between cycles to allow the circuit to return to equilibrium between cycles.

A brief mathematical analysis of the operation of the circuit is as follows:

At the very start of the detection process, when shorting transistor 11 is conducting, circuit node 19 is held at some voltage, $V_0$, near ground potential. When shorting transistor 11 is turned off, the voltage at node 19, $V_{19}$, at any instant, is given by:

$$V_{19}=V_0+\frac{1}{C_{10}}\int i_9 dt \qquad (1)$$

where $i_9$ is the current produced by constant-current generator 9, and $C_{10}$ is the value of current integrating capacitor 10. Reference signal level detector transistor 7 will begin to conduct when $V_{19}$ is equal to $V_{19(START)}$ such that $$V_{19(START)} = V_{BE(ON)_7} + V_{SAT_8} \quad (2)$$

where $V_{BE(ON)_7}$ is the base-emitter turn-on voltage for reference signal level detector transistor 7, and $V_{SAT_8}$ is the saturation voltage of reference signal level detector analog switch transistor 8.

Input signal level detector transistor 4 will begin to conduct when $V_{19}$ is equal to $V_{19(STOP)}$ such that $$V_{19(STOP)} = V_1 + V_{BE(ON)_4} \quad (3)$$

where $V_1$ is the input signal voltage and $V_{BE(ON)_4}$ is the base-emitter turn on voltage for input signal level detector transistor 4.

It should be noted that it is generally desired to make $V_{19(START)}$ equal to $V_{BE(ON)_4}$ so that these voltages may serve as a constant reference potential with respect to the timing of the START and STOP pulses.

In equation (1), $C_{10}$ and $i_9$ are constants, so that equation (1) converts to $$V_{19} = V_0 + (i_9/C_{10})\ t \quad (4)$$

For simplicity, let $(i_9/C_{10}) = k$, a constant. Then $$V_{19} = V_0 + kt \quad (5)$$

Combining equations (2) and (5), the time elapsed from the start of the cycle to the start of conduction of reference signal level detector transistor 7, $t_{(start)}$, and hence to the initiation of the START pulse, is $$t_{(start)} = [V_{BE(ON)_7} + V_{SAT_8} - V_0]\ k \quad (6)$$

Combining equations (3) and (5), the time elapsed from the start of the cycle to the start of conduction of input signal level detector transistor 4, $t_{(stop)}$, and hence to the initiation of the STOP pulse, is $$t_{(stop)} = [V_1 + V_{BE(ON)_4} - V_0]\ k \quad (7)$$

The elapsed time, $T$, between the initiation of the START and STOP pulses will be $$T = t_{(stop)} - t_{(start)} \quad (8)$$

Combining equations (6) and (7) into 8, we have $$T = [(V_1 + V_{BE(ON)_4} - V_0) - (V_{BE(ON)_7} + V_{SAT_8} - (V_0)]k \quad (8a)$$

If we assume $V_{BE(ON)_4} = V_{BE(ON)_7}$ and $V_{SAT_8} = 0$, then $$T = kV_1\ \text{(sec/volt)} \quad (9)$$

or, the time elapsed between the START and STOP pulses is directly proportional to the input voltage $V_1$.

Potentiometer 17 can be adjusted to compensate for $V_{BE(ON)_4} \neq V_{BE(ON)_7}$ and $V_{SAT_8} \neq 0$ so as to make equation (9) true, or may be adjusted to allow $$T = kV_1\ \text{(sec/volt)} + k_2\ \text{sec} \quad (10)$$

where $k_2$ is a deliberately induced value of offset in time.

Several working models of this level detector have been constructed for use as the input circuit of the analog-to-digital section of a digital voltmeter, with the elapsed time between the START and STOP pulses being used to start and stop a constant-frequency oscillator. Pulses from the oscillator occuring during the interval between the START and STOP signals are counted by an electronic counter and, with the application of the proper scale factor $k$, the count obtained and displayed by the electronic counter during this period is equivalent to the input voltage $V_1$ expressed in convenient units of voltage.

Typical circuit values and constants observed in the experimental models were as follows:

CIRCUIT VALUES

Resistor 2: 1 megohm
Capacitor 3: 0.1$\mu$F
Capacitor 10: 0.47$\mu$F
Potentiometer 17: 22K ohms
NPN Transistors: MPS6514
PNP Transistors: MPS3638A
i9: 100$\mu$A
$V_0$: 23mV
$V_{SAT}$ : 7mV
T: $3 \times 10^{-3}$ sec/volt Thus an electronic circuit is provided whereby pairs of electronic pulses may be generated in which the elapsed time between the pulses in each pair is as directly proportional as desired, or nearly so, to the amplitude of an applied D.C. voltage.

It will be evident that modifications may be made to the embodiment of the invention disclosed herein without departing from the scope of the invention as set forth in the vollowing claims. Examples of such modifications are using PNP rather than NPN transistors to detect the levels of negative rather than positive D.C. voltages, matching individual transistors to reduce offset effects, use of high gain transistors to reduce current kickback at the input terminal $V_1$, and incorporation of additional circuit elements, such as diodes and resistors, to protect the circuit against addidental overload.

What is claimed is:

1. High impedance signal detecting apparatus for receiving an input signal and for generating a pair of output pulses having a time interval therebetween corresponding to said input signal, said apparatus comprising:

a constant current generating circuit;

an integrating capacitor coupled to said constant current generating circuit for generating a linearly increasing signal;

a shorting transistor coupled across said integrating capacitor for first discharging and thence isolating said integrating capacitor to initiate a cycle of linearly increasing signal;

a signal level analog switching transistor for providing a reference signal; a reference signal detecting means comprising a reference signal level transistor having a base electrode coupled to said integrating capacitor, an emitter electrode coupled to said signal level analog switching transistor and a collector electrode for comparing said linearly increasing signal with said reference signal level and generating a first of said output pulses when the linearly increasing signal becomes equal to said reference signal;

a start pulse amplifying transistor coupled to the collector electrode of said reference signal level transistor for amplifying and passing the first of said output pulses;

an input signal receiving means;

an input signal level detecting means comprising an input signal level transistor having a base electrode coupled to said integrating capacitor, an emitter electrode coupled to said input signal receiving means and a collector electrode, said input signal level detecting means being operable to generate the second of said output pulses when the linearly increasing signal of said integrating capacitor corresponds to said input signal;

and a stop pulse amplifying transistor coupled to the collector electrode of said input signal level transistor for amplifying and passing the second of said output pulses.

2. High impedance signal detecting apparatus in accordance with claim 1 wherein said input signal receiving means comprises an input terminal, a signal storage capacitor, and a resistance element coupled between said input terminal and said signal storage capacitor.

3. High impedance signal detecting apparatus in accordance with claim 1 further comprising a signal compensating means, said signal compensating means comprising a potentiometer coupled between said start pulse amplifying transistor and said stop pulse amplifying transistor, said potentiometer having an adjustable intermediate contact coupled to ground potential.

* * * * *